United States Patent
Long

(10) Patent No.: US 10,552,657 B2
(45) Date of Patent: *Feb. 4, 2020

(54) METHODS AND ARRANGEMENTS FOR SENDING STORED INFORMATION FROM AN IMAGING DEVICE

(71) Applicant: Digimarc Corporation, Beaverton, OR (US)

(72) Inventor: Scott M. Long, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,485

(22) Filed: Feb. 11, 2019

(65) Prior Publication Data

US 2019/0243999 A1    Aug. 8, 2019

Related U.S. Application Data

(63) Continuation of application No. 15/918,840, filed on Mar. 12, 2018, now Pat. No. 10,204,253.

(60) Provisional application No. 62/593,738, filed on Dec. 1, 2017.

(51) Int. Cl.
| | |
|---|---|
| *G06K 7/14* | (2006.01) |
| *G06Q 20/20* | (2012.01) |
| *G07G 1/00* | (2006.01) |
| *G07G 3/00* | (2006.01) |
| *G07G 1/01* | (2006.01) |

(52) U.S. Cl.
CPC ......... *G06K 7/1417* (2013.01); *G06K 7/1413* (2013.01); *G06Q 20/208* (2013.01); *G07G 1/0009* (2013.01); *G07G 1/0045* (2013.01); *G07G 1/01* (2013.01); *G07G 3/00* (2013.01)

(58) Field of Classification Search
None
See application file for complete search history.

(56) References Cited

U.S. PATENT DOCUMENTS

| | | |
|---|---|---|
| 5,194,720 A | 3/1993 | Reinnagel et al. |
| 5,493,213 A | 2/1996 | Collins, Jr. et al. |
| 5,756,981 A | 5/1998 | Roustaei et al. |
| 5,929,418 A | 7/1999 | Ehrhart et al. |
| 6,189,792 B1 | 2/2001 | Heske, III |
| 6,398,113 B1 | 6/2002 | Heske, III |
| 6,540,143 B1 | 4/2003 | Matsumori |
| 6,590,996 B1 | 7/2003 | Reed |
| 7,207,488 B2 | 4/2007 | Hammerslag et al. |
| 7,575,167 B2 | 8/2009 | Kotlarsky |
| 7,607,581 B2 | 10/2009 | Kotlarsky et al. |

(Continued)

OTHER PUBLICATIONS

Wikipedia Article "Universal Product Code," Nov. 4, 2017.

*Primary Examiner* — Kristy A Haupt
(74) *Attorney, Agent, or Firm* — Digimarc Corporation

(57) ABSTRACT

Debug information is output from a point-of-scale scanner by disguising it as one or more product identifiers (e.g., Global Trade Item Numbers, or GTINs). Generation of such "faux GTINs" to convey the debug information can be activated by presenting a special machine readable code to the scanner. Repetitive patterns in the debug information are desirably varied to avoid triggering duplicate detection logic in the scanner, which might otherwise suppress outputting of such repetitive information.

20 Claims, 5 Drawing Sheets

(56) References Cited

U.S. PATENT DOCUMENTS

| | | | |
|---|---|---|---|
| 7,611,055 B1 | 11/2009 | Detwiler | |
| 7,708,205 B2 | 5/2010 | Kotlarsky | |
| 7,815,121 B2 | 10/2010 | Kotlarsky | |
| 8,317,105 B2 | 11/2012 | Kotlarsky et al. | |
| 9,022,288 B2 | 5/2015 | Nahill et al. | |
| 9,070,032 B2 | 6/2015 | Corcoran | |
| 9,477,854 B2 | 10/2016 | Ackley | |
| 9,552,543 B2 | 1/2017 | Toedtli et al. | |
| 10,204,253 B1 * | 2/2019 | Long | G06K 7/1417 |
| 2004/0079804 A1 | 4/2004 | Harding | |
| 2011/0284625 A1 | 11/2011 | Smith | |
| 2014/0052555 A1 | 2/2014 | MacIntosh | |
| 2016/0217547 A1 | 7/2016 | Stach | |
| 2016/0364623 A1 | 12/2016 | Evans | |
| 2017/0024840 A1 | 1/2017 | Holub | |

* cited by examiner

```
{
    "input_metadata":{                              ← 41
        "width":1280,
        "height":1024,
        "stride":1280,
        "watermark_type":"chroma_package",
        "pixel_format":"grayscale"
    },
    "processing_configuration":{                    ← 42
        "read_all_blocks":false,
        "fine_scale":{
            "start":0.60,
            "range":0.85
        },
        "blocks":[
            {
                "block_id":1,                       ← 43a
                "coarse_scale":3,
                "center_x":384,
                "center_y":288,
                "perspective_correct_45":0,
                "flipped_image":false,
                "perspective_correction":true,
                "perspective_correction_params":{
                    "focal_length_x":2240.0,
                    "focal_length_y":2240.0,
                    "camera_principal_point_x":516.0,
                    "camera_principal_point_y":368.0,
                    "tilt_degrees":37.0,
                    "bearing_degrees":338.0
                }
            },
            {                                       ← 43b
                "block_id":2,
                "coarse_scale":3,
                "center_x":768,
                "center_y":288,
                "perspective_correct_45":0,
                "flipped_image":false,
                "perspective_correction":true,
                "perspective_correction_params":{
                    "focal_length_x":2240.0,
                    "focal_length_y":2240.0,
                    "camera_principal_point_x":516.0,
                    "camera_principal_point_y":368.0,
                    "tilt_degrees":37.0,
                    "bearing_degrees":338.0
                }
            },
```

FIG. 4A

```
{
    "block_id":3,                              ← 43c
    "coarse_scale":3,
    "center_x":384,
    "center_y":738,
    "perspective_correct_45":0,
    "flipped_image":false,
    "perspective_correction":false,
    "perspective_correction_params":{
        "focal_length_x":0.0,
        "focal_length_y":0.0,
        "camera_principal_point_x":0.0,
        "camera_principal_point_y":0.0,
        "tilt_degrees":0.0,
        "bearing_degrees":0.0
    }
},
{
    "block_id":4,                              ← 43d
    "coarse_scale":3,
    "center_x":768,
    "center_y":738,
    "perspective_correct_45":0,
    "flipped_image":false,
    "perspective_correction":false,
    "perspective_correction_params":{
        "focal_length_x":0.0,
        "focal_length_y":0.0,
        "camera_principal_point_x":0.0,
        "camera_principal_point_y":0.0,
        "tilt_degrees":0.0,
        "bearing_degrees":0.0
    }
},
{
    "block_id":5,                              ← 43e
    "coarse_scale":3,
    "center_x":588,
    "center_y":288,
    "perspective_correct_45":0,
    "flipped_image":false,
    "perspective_correction":false,
    "perspective_correction_params":{
        "focal_length_x":0.0,
        "focal_length_y":0.0,
        "camera_principal_point_x":0.0,
        "camera_principal_point_y":0.0,
        "tilt_degrees":0.0,
        "bearing_degrees":0.0
    }
},
        .
        .
        .
```

FIG. 4B

METHODS AND ARRANGEMENTS FOR SENDING STORED INFORMATION FROM AN IMAGING DEVICE

RELATED APPLICATION DATA

This application is a continuation of application Ser. No. 15/918,840, filed Mar. 12, 2018 (now U.S. Pat. No. 10,204,253), which claims priority to provisional application 62/593,738, filed Dec. 1, 2017. The disclosures of these prior applications are incorporated herein, in their entireties.

BACKGROUND AND INTRODUCTION TO THE TECHNOLOGY

Point-of-sale scanners that read machine readable codes (e.g., barcodes and digital watermarks) from packaged retail products using 2D imaging sensors, are now commonly found in supermarkets and other retail establishments. When such a scanner captures an image of a machine readable code, it commonly decodes a "GTIN" (Global Trade Item Number) payload, performs some data checking, and then outputs the GTIN to a serial port (or USB port) for transmission to an associated point-of-sale (POS) terminal.

The functionality of such a scanner is established by firmware store in device memory. The firmware is typically produced by the scanner manufacturer (e.g., Company S—for scanner), and may include components provided from outside companies. One such component may be software for decoding steganographic digital watermarks (software provided by Company W—for watermark), which are encoded in the artwork of product packaging and convey product GTINs.

In an exemplary development cycle for a scanner, Company S designs a new product offering, and provides associated hardware and software specifications (e.g., image size, frame rate, image data format, API calls, etc., etc.) to companies who will be providing software components to be included with the scanner. Company W sends the latest version of its watermark decoding software to Company S, along with configuration instructions that customize the software for the hardware-specific parameters. Such software is commonly provided as a Software Development Kit (SDK), which can include source code instructions (e.g., in C++), required code libraries, and other software development tools.

Company S performs a "build" process in which the watermark SDK, the configuration data, and other software modules and data (including software authored by Company S), are compiled together into firmware code, which is loaded into beta versions of the new hardware platform by testing—including testing by Company W. As feedback from the testing is generated, Companies S and W modify their respective software/configuration data, and the cycle repeats.

While seemingly straightforward, this process is prone to confusion in actual practice. Due to typically-tight product development deadlines, things are done in a hurry. Company S may issue several new builds of its firmware each week. As testing progresses, Company W may modify its configuration instructions on a similar schedule, with occasional updates to its SDK. In the rush, Thursday's build of the scanner firmware may include Tuesday's revision of the watermark configuration instructions—while Wednesday's revision waits in a still-unopened email in the Inbox of a Company S developer. Or the Thursday build of the firmware may employ last week's version of the watermarking SDK, while a newer SDK release that was delivered Wednesday was saved into a wrong directory and is overlooked at build time.

The build process performed by Company S commonly involves proprietary tools and software that Company S does not share with others (e.g., Company W). As a consequence, the build process cannot be replicated or verified by Company W.

The various versions of firmware resulting from this process can be stews of uncertain ingredients.

This uncertainty about what version of Company W's SDK was used in a particular build of the firmware, and which set of Company W's configuration data was employed, makes troubleshooting difficult. If the scanner—with the latest firmware loaded—does not behave as expected, Company W naturally assumes it was built with the SDK and configuration data that was most-recently delivered to Company S. (Company S may say so, too, incorrectly.) But this assumption may be wrong. This problem can lead Company W to focus on a certain piece of code, or a particular item of configuration data, as the potential source of a troublesome behavior when, in fact, the suspect code/configuration data was not even included in the build being tested. Much frustration can result. And, as a consequence, delivery of the finished scanner product to commercial customers can be delayed.

To try and address this problem, Company S could design the hardware with the capacity to output version data for included software components and configuration instructions—either via the serial data port through which item identification codes are normally sent to the associated point-of-sale terminal, or via an administrative data port specialized for diagnostic and other control data. Company W could then modify its SDK to send version information, for the watermark SDK and for the configuration data, to such an output port each time the scanner is booted, thereby resolving the noted uncertainties about what components were included in a particular firmware build.

Unfortunately, such a solution may introduce as many difficulties as it solves.

There is no standardization as to the design or use of such an output port to provide debug information. And there is not just one Company S; there are multiple competing scanner companies: Company S1, Company S2, Company S3, etc. If scanners of Company S1 have the capacity to output debug information, their software requirements for this functionality—and often their associated hardware designs—will likely be different than counterpart software requirements/hardware designs included in scanners of Company S2. Moreover, even within different scanner offerings of a single company, the hardware or software protocols associated with outputting debug information may be different. This can require Company W to write special code tailored to the hardware and software requirements for each company's scanners (and sometimes for each scanner model of each company)—customized to the parameters of the output port (if present) and its communication protocols. Still further, Company W may not even have access to the output port; that port may be managed exclusively by software from Company S, and intended only for its use.

If such an arrangement were practical, it would increase the development and testing burden on Company W. It would also proliferate different variants of software—increasing the risk that an SDK sent for use with a particular scanner company may be incompatible. (And with more variants of software come more opportunities for bugs to creep in.)

One aspect of the present technology concerns getting debug information from a scanner, even without control over the scanner's output port(s). This is done, in a particular embodiment, by reading chunks of diagnostic data from a scanner memory, and formatting them to appear as GTIN identifiers, for outputting by the scanner. GTINs created for this purpose of conveying debug information from the scanner are termed "faux GTINs" in this specification. This debug reporting mechanism can be activated by presenting a special machine readable code (a "trigger code") to the scanner.

The prior art teaches that a special barcode can be presented to a scanner to enter configuration data or instructions into a scanner. For example, U.S. Pat. No. 5,929,418 teaches that a scanner can be reprogrammed by reading special barcodes from a printed booklet. U.S. Pat. No. 5,756,981 similarly teaches that a scanner CPU can be placed in a "programming" mode by detection of a special barcode. U.S. Pat. No. 8,317,105 teaches that a special bar code can be presented to a scanner to unlock certain functionality, such as decoding of certain symbologies. Such patents, however, do not teach the opposite process—getting information out of a scanner.

Nor is the prior art understood to teach or suggest altering diagnostic data so that it appears as a faux GTIN.

Outputting GTINs is the basic function that retail scanners exist to perform. GTINs output by a scanner form a one-way communication channel—a channel that is reliably present in all scanners. Aspects of the present technology employ this primary scanner functionality as a communications channel to output debug information, without requiring specialized knowledge about the make, model or hardware configuration of the scanner, nor control over its output port(s).

In another aspect of the present technology, Applicant recognized a particular problem with this approach of altering debug information to form faux GTIN codes, namely duplicate detection logic found in scanner software. Such logic is provided to ensure that a shopper is charged only once for an item, even if the item may be depicted in multiple sequential frames captured by the scanner, from which the same machine readable code is multiply-decoded. Such logic commonly notes each payload that is output to the POS terminal, and starts a duplicate detection timer (e.g., 1 second). If the same payload is again decoded within the timer interval, the scanner prevents that repeated payload from being reported again to the POS terminal.

Depending on the nature of diagnostic data to be output, two or more sequential faux GTINs may convey the same information. (Consider, e.g., a long string of zeroes in the diagnostic memory.) Accordingly, another aspect of the present technology involves ensuring that identical chunks of data read from the diagnostic memory are not conveyed by identical faux GTINs (which might be filtered by the duplicate detection logic).

The foregoing and other features and advantages of the present technology will be further apparent from the following detailed description, which proceeds with reference to the accompanying drawings.

BRIEF DESCRIPTION OF THE DRAWINGS

FIGS. 4A and 4B detail watermark decoding parameters with which a scanner may be configured.

DETAILED DESCRIPTION

The present technology makes use of item identification codes, such as Global Trade Identification Numbers (GTINs). GTINs comprise two primary parts: a company prefix, and an item identifier. Company prefixes are assigned by the GS1 organization. Item identifiers are managed by the companies themselves. The GTIN for a 12 oz. bottle of Coca Cola is 049000000443. 49000 is the company prefix, and is associated with Coca-Cola USA Operations, PO Box 1734, Atlanta, Ga. 30301-1734, per the public GS1 database. 00044 is the company-assigned item identifier for the 12 oz. bottle of Coca Cola. The last digit "3" is a check digit, computed from the preceding digits. The first digit "0" is an indicator digit. ("0" indicates a base unit GTIN; the digits 1 to 8 are used to define packaging hierarchies of a product within the same item reference, and digit 9 indicates a variable measure trade item.)

GTINs can be conveyed on products in different ways. Most popular, in the US, is by UPC codes. In Europe, EAN-13 is popular. Digital watermarks can also convey GTINs, and are becoming increasingly popular. Since digital watermarks are often steganographic (i.e., imperceptible to human visual on casual inspection) and somewhat difficult to visualize, the present discussion sometimes refers to barcodes. However, it should be understood that a digital watermark can be substituted wherever a barcode is referenced. (Indeed, a digital watermark can be regarded as a form of barcode, albeit commonly steganographic rather than overt.)

Figure 1:
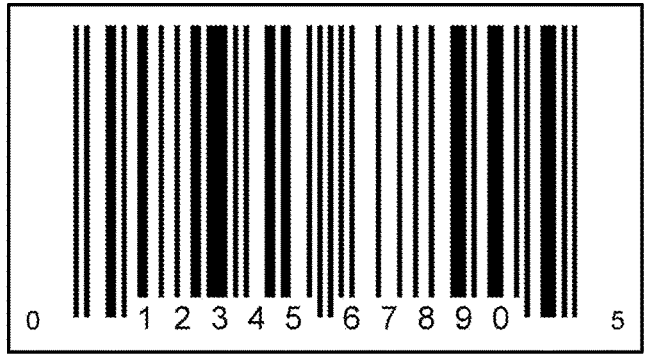
FIG. 1 shows a prior art UPC-A stripe barcode.

FIG. 1 shows an illustrative UPC code. It conveys a 12 digit payload, such as the GTIN for a bottle of Coca Cola. In UPC codes, each decimal digit is represented by a unique pattern of 2 bar and 2 space strips of different widths, with such digit patterns being inverted on the left and right sides. Quiet zones on the left and right are kept blank. The barcode includes the 12 encoded digits printed in human readable form, with the first digit in the left quiet zone, the next five digits on the left side, the following five digits on the right side, and the twelfth digit in the right quiet zone.

As noted, the twelfth digit, X12, is a check digit. It is selected based on the preceding digits X1-X11 to satisfy the "Check Digit Equation:"

$$\text{Mod } 10(3X1+X2+3X3+X4+3X5+X6+3X7+X8+3X9+X10+3X11+X12)=0$$

In the discussion that follows, the check digit is generally represented as a "C."

Figure 2:
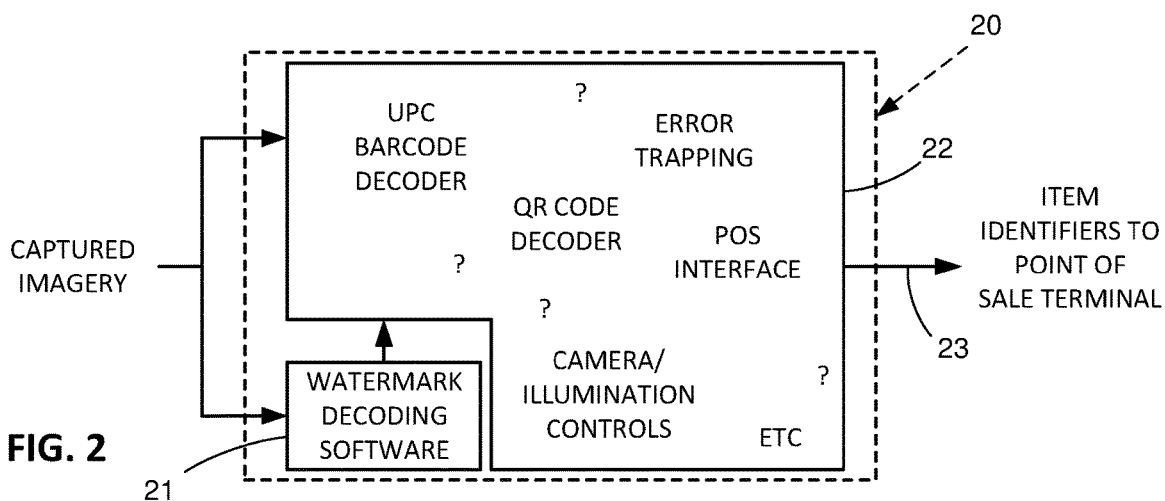
FIG. 2 is a diagram showing components of scanner firmware, including watermark decoding software, which outputs data to other software, for transmission across a scanner output port to a point-of-sale terminal.

FIG. 2 is a conceptual view of firmware in a retail scanner 20. For present purposes, there is watermark decoding software 21, and everything else 22. Imagery from one or more 2D image sensors is provided both to the watermark decoding software 21, and to the other software 22. The watermark decoding software sends item identifiers to the other software 22. The other software sends item identifiers (decoded both from watermarks and from barcodes) to a connected point-of-sale terminal over a serial or USB port 23.

The software 22 is, in essence, an opaque black box, except to the scanner manufacturer that builds it. It necessarily includes decoding modules for each of the symbologies that the scanner can recognize (e.g., UPC codes, QR codes, etc.). It also must include software for controlling the camera and illumination system, e.g., grabbing 40 frames per second, coincident with strobed illumination from red LEDs. It also needs to include an interface to convey the decoded item identifiers (e.g., GTINs) to the POS terminal using the port 23.

Importantly, software 22 also includes some sort of error trapping code. Such code, for example, includes the duplication detection logic noted earlier, which prevents more than one item identifier from being sent to the POS terminal, even if multiple images of the same item are captured and decoded. Other error trapping may also be performed, which can vary between different scanner manufacturers, and which such manufacturers generally keep as trade secrets. For purposes of the present technology, this error trapping code may be regarded as a "man in the middle" (using a cryptographic analogy) that can interfere with delivery of data sent from the watermark detector software 21 for delivery to the scanner output 23.

Since the other software 22 is not publicly documented, its behavior and other components are, in part, a mystery— indicated by the question marks in FIG. 2.

Figure 3:
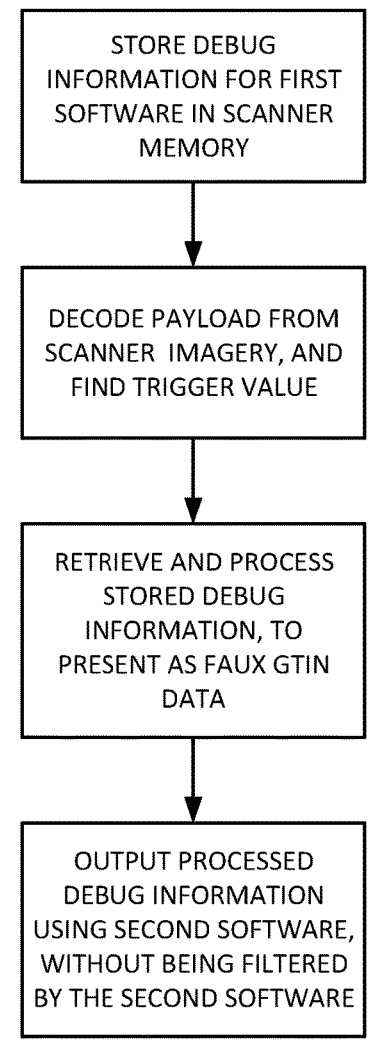
FIG. 3 is a flow chart illustrating one particular embodiment of the technology.

FIG. 3 gives an overview of one embodiment of the present technology. Either during normal operation, or in response to a special barcode presented to the scanner, software in the scanner (e.g., watermark software 21) writes debug information to an internal memory. The scanner software (e.g., again watermark software 21) later checks decoded barcode payloads for a trigger value. When this trigger value is detected, the software controls the device to retrieve and process some or all of the debug information stored in the memory, and format it to appear as one or more GTIN identifiers. These "faux GTINs" are then sent from the scanner, just like any other item identifier (e.g., they are passed from the watermark software 21 to the other software 22, for outputting on the scanner's output port 23).

The debug information that is written to the memory can be any data that may be useful in troubleshooting anomalous behavior of the scanner. For example, it can comprise configuration data that defines one or more aspects of scanner operation.

As is familiar, e.g., from Applicant's published patent document 20160364623 and pending application Ser. No. 15/641,081, filed Jul. 3, 2017 (published as 20180005343), and Ser. No. 15/816,098, filed Nov. 17, 2017, watermark decoding software is commonly configured to examine only certain regions (blocks) within each captured image frame. Exhaustive analysis of the entirety of each image is generally not practical, due to processing constraints. Configuration data defines the location(s) of these blocks within the frame, and the affine or perspective transformations that should be respectively applied to each block prior to watermark decoding, to restore it to a pose from which watermark data may more readily be extracted.

FIGS. 4A and 4B show configuration data that may be associated with the watermark decoding software 21 of FIG. 2.

Data block 41 in FIG. 4A defines basic configuration parameters, including size of the image frame to be analyzed (1280×1024 pixels), the type of image (grayscale), and the type of watermark to be decoded (chroma).

Data block 42 defines what type of processing is to be applied. In particular, "read_all_blocks" specifies whether processing should stop when a GTIN-containing watermark is decoded from a block, or whether processing should continue through all configured blocks—even after such a watermark is successfully decoded. The "fine_scale" data defines the range of watermark scales for which the decoder should search in attempting watermark decoding from a block, here from 60% to 145%.

Then follows the definitions of one or more image blocks within the scanner imagery, on which watermark decoding should be attempted. Data block 13*a* defines a first image block, including its center x,y pixel locations {384,288}, and its scale (e.g., the amount by which the image block is down-sampled, here 3). Perspective viewpoint parameters are also defined, including the x,y focal lengths, the camera principal points, and the tilt and bearing.

Data block 13*b* defines a second image block, which is similar to the first image block, except that it is centered at image pixel {768,288}. Other data blocks 13*b*-13*e* (which continue into FIG. 4B) define other such blocks of imagery that are specified for watermark decoding. While five blocks are shown, a greater or lesser number can naturally be specified.

In addition to configuration data, debug information can also comprise version information for the watermark decoding software 21, and any of its components.

Debug information can also include data or statistics gathered by the watermark decoding software during its operation. For example, the software may store, in the diagnostic memory, information about the most recently-decoded watermark. This can include the watermark payload, its signal-to-noise ratio, pose parameters for the decoded block(s) (e.g., scale, rotation, x-translation, and y-translation), the number of raw bit errors, and other metrics. Debug information can also include data about the image frame previously-processed, including contrast metrics and a histogram of values.

Performance data can also be included, such as an identification of which branches were followed in execution of the watermark decoding software, and the number of milliseconds that different portions of that software executed their respective parts of the watermark decoding task.

Different items of debug information can be stored in different parts of the memory, so that they can be accessed individually. Alternatively, each item of data can be tagged, e.g., with an XML tag, so that particular items of data can be located by searching the diagnostic memory for particular tags.

Figure 5:
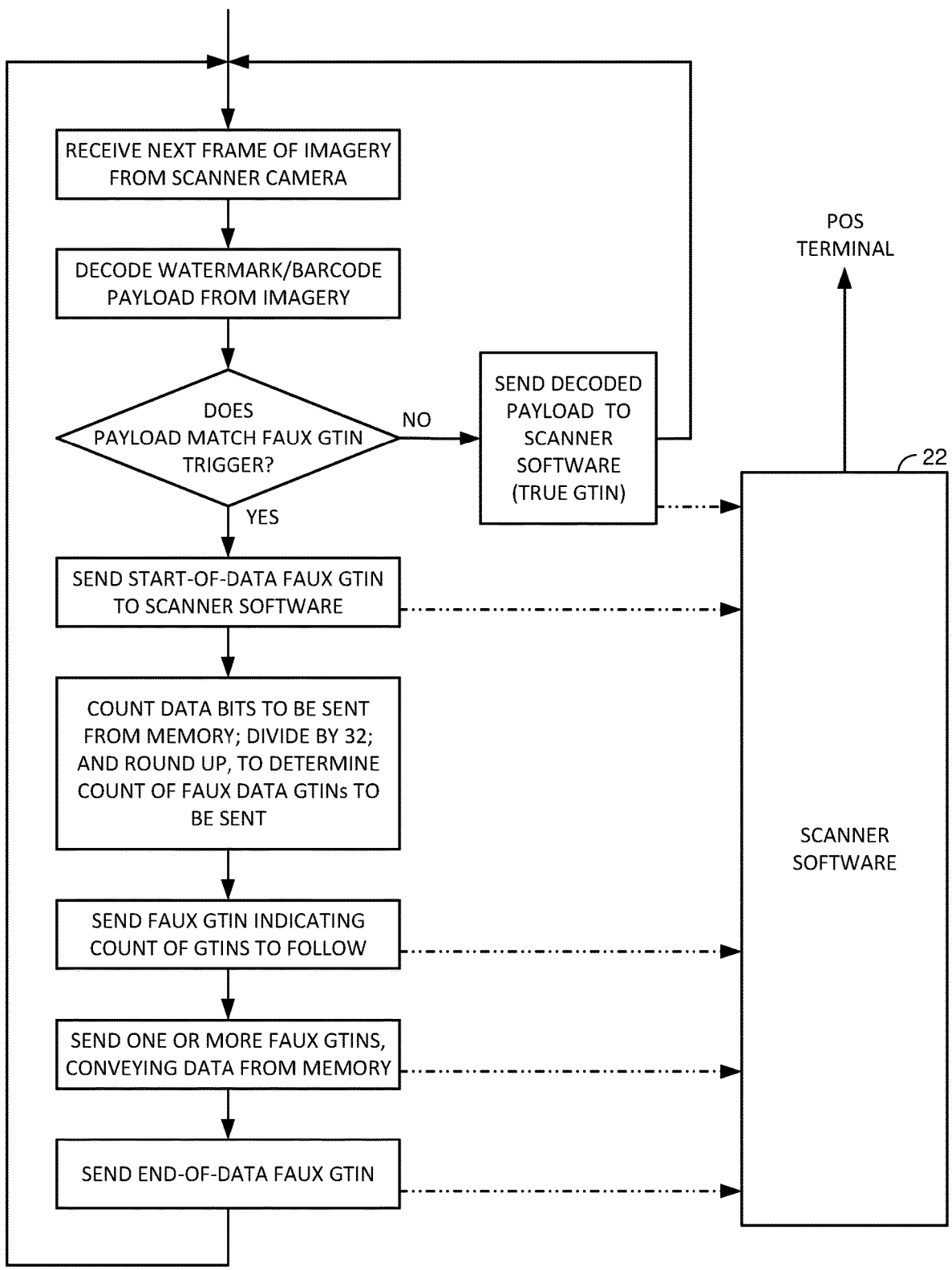
FIG. 5 is a flow chart further detailing aspects of the embodiment of FIG. 3.

FIG. 5 further details certain of the processes shown in FIG. 3. During operation of the scanner, frames of imagery are successively provided to decoder software, which analyzes each frame for the presence of a machine readable identifier. Decoded item identifiers are checked to see if their values match special faux GTINs that serve as trigger codes, associated with debug-reporting functionality. If not, the identifiers are processed in the usual manner, with the decoded (true) GTIN sent to the output port 23 for transmission to the POS terminal.

If a decoded payload matches a special TRIGGER faux GTIN value, a reporting routine is invoked. This routine starts with issuance of a pre-defined START OF DATA faux GTIN (e.g., indicating that data which follows is debug data). The software next sends a particular faux GTIN, drawn from a pre-defined vocabulary, that serves as a label indicating a number of faux GTINs that follow, conveying debug data. Following transmission of one or more such faux GTINs conveying debug data, the software sends another pre-defined fax GTIN that serves as an END OF DATA label, signaling the end of the process.

Table 1 details an illustrative sequence of data from one particular implementation:

TABLE 1

| TRIGGER | 00123459999C |
|---|---|
| START OF DATA | 00123459990C |
| DEBUG DATA LABEL #4 (INDICATING 4 GTINS FOLLOW) | 00123450004C |
| DEBUG DATA | 78464970841C |
| DEBUG DATA | 56471182275C |
| DEBUG DATA | 92363801212C |
| DEBUG DATA | 54982571853C |
| END OF DATA | 00123450000C |

The pre-defined faux GTINs (e.g., TRIGGER, START of DATA, END OF DATA, and COUNT LABEL) can include a valid company prefix for the company that is providing the software in which this debug reporting functionality is included (e.g., the vendor of the watermark decoding software). This guards against the possibility that one of these special GTINs might be encountered among merchandise items encountered in a store. In the illustrated embodiment, the faux GTIN's representing debug data itself do not use a prescribed prefix, so that more of the digit capacity can be used to convey debug data.

In a particular embodiment, there are different TRIGGER faux GTINs, each of which triggers delivery of a different type of data from the diagnostic memory. For example, a TRIGGER GTIN ending in 9999 can initiate delivery of all data in the diagnostic memory. A TRIGGER GTIN ending in 9991 can initiate delivery of pose information for the last-decoded watermark. A TRIGGER GTIN ending in 9992 can initiate delivery of the version number for the watermark decoding software. A TRIGGER GTIN ending in 9993 can initiate delivery of data indicating the signal-to-noise ratio of the last-decoded watermark. Etc.

Figure 6:
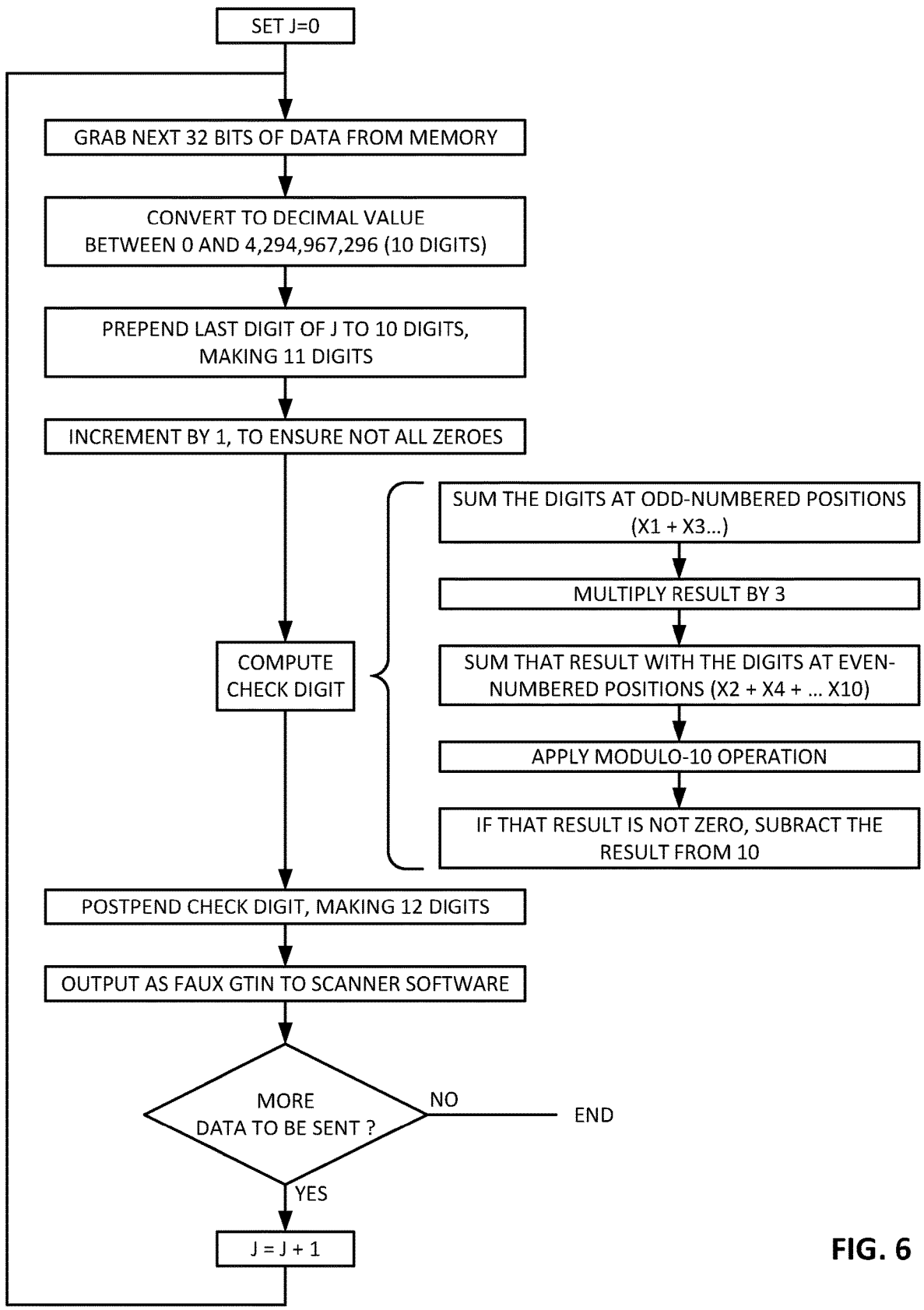
FIG. 6 is a flow chart further detailing other aspects of the embodiment of FIG. 3.

FIG. 6 is a flow chart detailing a particular algorithm by which data from the diagnostic memory can be represented as faux GTINs, while avoiding interference by the error trapping logic in the other software 22.

A value "J" is first initialized to zero. ("J" is used later as the first bit of the debug data-conveying faux GTINs. "J" is varied—one GTIN to the next—to avoid suppression of the GTIN by the duplication detection logic.)

A 32 bit chunk of data is read from the memory, and is converted to a corresponding decimal value. A 32 bit binary number can always be represented as a ten digit decimal number, and the software makes this conversion. "J" is then pre-pended to the decimal value, yielding an 11 digit decimal string.

As further insurance against interference by the error trapping logic in the scanner, this 11 digit string is next incremented by one. This ensures that the algorithm never outputs a faux GTIN consisting of all zeroes, which the error trapping logic might regard as erroneous and suppress.

A check digit is next computed, using the algorithm specified by the UPC standard, and appended to the end of the 11 digit string, extending the string to 12 decimal digits. This 12 digit value is then output from the software as a faux GTIN for transmission on the output port 23 (e.g., passing from the watermark decoding software 21 through the other software 22).

The algorithm next checks whether more debug data is to be sent. If not, the process terminates, and the END OF DATA faux GTIN is sent.

If more data is to be sent, J is incremented, and the process repeats—with a next chunk of stored debug data.

In such embodiment, if there is a long string of repeated debug data (e.g., 000000 . . . ), the pre-pended J causes the embodiment to emit a sequence of 10 unique faux GTINs before any GTIN is repeated. It is improbable that any error trapping routine in the software 22 would trap a GTIN that is duplicated only after nine intervening, different, GTINs.

In a variant embodiment, instead of simply pre-pending the incrementing J values to the debug data, the J value can be placed in a position, within the faux-GTIN, that is incremented cyclically for each code. This produces a sequence of J values/positions that is 99 long, e.g.:

1xxxxxxxxxxC
x2xxxxxxxxxC
xx3xxxxxxxxC
xxx4xxxxxxxC
xxxx5xxxxxxC
xxxxx6xxxxxC
xxxxxx7xxxxC
xxxxxxx8xxxC
xxxxxxxx9xxC
xxxxxxxxx1xC
xxxxxxxxxx2C
3xxxxxxxxxxC
x4xxxxxxxxxC
xx5xxxxxxxxC
. . .
xxxxxxxx5xxC
xxxxxxxxx6xC
xxxxxxxxxx7C
8xxxxxxxxxxC
x9xxxxxxxxxC
xx1xxxxxxxxC
xxx2xxxxxxxC
xxxx3xxxxxxC
xxxxx4xxxxxC
xxxxxx5xxxxC
xxxxxxx6xxxC
xxxxxxxx7xxC
xxxxxxxxx8xC
xxxxxxxxxx9C It is still more improbable that any error trapping routine in the software 22 would trap a a GTIN that is duplicated only after 98 intervening, different, GTINs.

A further variant, which can be used with any of the just-described arrangements, employs the capacity of faux GTINs to convey data which is not otherwise utilized. In particular, ten GTIN digits are used to convey the debug data payload. But the largest 32 bit payload of debug data is 4,294,967,295, when represented in decimal form (as used in the faux GTINs). Thus, leading digits of 5-9 are never used in the leading decimal digit position.

In this further variant, a leading payload digit of "0" may be encoded as a "5." Similarly, leading payload digits of "1"-"4" may be encoded as "6"-"9" (either respectively, e.g., "5" for "0," or by some other predefined mapping, e.g., "7" for "0"). When encoding the first digit of the debug payload, the software can choose the encoding that avoids a most-recent duplicate.

For example, in the first embodiment, in which the incrementing value "J" is simply pre-pended to the debug payload, if the debug data is all "0"s, the payloads repeat after ten faux GTINS:

00000000000C
10000000000C
20000000000C 30000000000C
40000000000C
50000000000C
60000000000C
70000000000C
80000000000C
90000000000C
00000000000C (duplicate of ten back!)
10000000000C (duplicate of ten back!)
20000000000C (duplicate of ten back!)

Using the just-described alternative encoding for the leading payload digit (e.g., swapping "5" for "0"), this same payload sequence is conveyed without repetition:

00000000000C
10000000000C
20000000000C
30000000000C
40000000000C
50000000000C
60000000000C
70000000000C
80000000000C
90000000000C
05000000000C
15000000000C
25000000000C

Similarly, this alternate encoding can be used with the arrangement in which the value, and position, of J is incremented for each faux GTIN, doubling the length of the sequence, prior to repeating, from 99 to 198.

In yet a further variant arrangement, the duplicate mitigation strategy (e.g., based on an added digit J, and/or the position of J within the payload digits, and/or the use of alternate encoding for the leading decimal digit) is not invoked routinely. Instead, the debug data reporting software maintains a history of the most-recent dozens, or hundreds, or thousands, of faux GTINs it has utilized, and invokes the duplicate mitigation strategy only when needed to avoid duplication of a faux GTIN within the history. That is, there is no need to employ duplicate mitigation measures when the payload data is, itself, providing a sequence of unique values.

In some scanners, the error trapping logic may prevent the scanner from outputting more than a small number N (e.g., 4 or less) of GTINs per input image frame—reasoning that it is improbable for identifiers for a greater number of items to be decoded from a single image frame. To guard against this form of interference by the scanner software 22, the debug data reporting mechanism (software) can monitor incoming frames and issue N faux GTIN(s) as each frame is received, while disregarding the contents of the frames themselves (until all of data requested from the memory has been output).

The scanner's error trapping logic may also be configured to be suspicious if each successive frame (provided from the camera system at a rate of tens of frames per second) leads to issuance of different GTINs. That would indicate that the clerk or customer who is scanning items is unusually capable. Thus, the software 22 may start suppressing GTINs if it detects a sequence of three or four or more frames that each produces a different GTIN. To guard against this form of interference, the debug data reporting mechanism can be arranged to allow M (e.g., five or ten) frames of camera imagery to pass without response, between each frame for which a faux GTIN is issued.

The values M and/or N can be set by a special barcode presented to the scanner. Or these values may be included as two variable digits in the trigger barcode that is presented to the scanner to initiate this debug data reporting mechanism. (Or the values can be fixed by the software.)

Again, since the error trapping logic applied by the scanner software 22 is not publicly documented, it is best to implement the debug reporting mechanism in a somewhat paranoid and conservative manner.

If connected to a POS terminal, the faux GTINs generally will not correspond to any retail product in the store's database. In such case, POS terminals are commonly configured to print the GTINs on a register tape, alone, without associated price and descriptive text (which would be printed with GTINs that are found in the database). Invoking the above-detailed debug reporting functionality can thus result in a scroll of tape with diagnostic data sent from the scanner in the form of faux GTINs. This printed data can be scanned by OCR software, and the series of OCR'd faux GTINs can then be converted back into binary data by software written for this purpose.

More commonly, however, the scanner is not connected to a POS terminal during a debugging procedure. Rather, the scanner's output port is connected to a computer that logs and reports the serial data—avoiding the need for the OCR'ing operation. Again, each GTIN can be converted back to a 32 bit binary string, and such strings can be assembled to recreate debug data read from the scanner's diagnostic memory.

By such arrangements, diagnostic data can be obtained from a scanner without regard to whether it has a diagnostic port, and without the scanner's error trapping logic jeopardizing integrity of the delivered data.

Concluding Remarks

Having described and illustrated the present technology with reference to an example embodiment, it should be recognized that the technology is not so limited.

For example, while the illustrated embodiment circumvents the hazards of duplication detection logic by various detailed strategies to prevent repetition of the output faux GTINs, it will be recognized that duplicate strings of data can be disguised by many other techniques. One is simply to add an incrementing value of J to the payload, rather than insert it as one of the GTIN digits. (In this arrangement, as in the others, the received GTIN payloads must be processed to remove the effect of the added, or inserted, value of J.)

In the detailed arrangements, the use of J data that varies predictably from one faux GTIN to the next provides a data integrity check. The series of faux GTINs output to the serial port can be checked to verify that each includes an expected value of J corresponding to its position in the sequence. If the J value changes in an unexpected matter, this indicates some interference by the error trapping in the scanner software 22, e.g., suppressing issuance of one or more of the faux GTINs.

While reference was made to a diagnostic memory, this need not be a special or dedicated memory in the scanner. Rather, it can be memory that is used otherwise, and allocated as the need arises. In some embodiments the memory can be operated as a stack or queue, with data pushed down and popped off the stack in a last in-first out arrangement.

Although the debug-reporting functionality is described as being initiated by detection of a special trigger-valued barcode, this is not necessary. The functionality can be invoked otherwise, such as by a signal provided to the scanner across the serial port or another port, or by a different triggering signal.

The use of 12 digit GTIN item identifiers is not essential. GTINs can be longer or shorter (e.g., 8, 12, 13 or 14 digits in length). And identifiers other than GTINs can be employed. The technology can be practiced with item identifiers of any type and length, conveyed by any machine readable symbology. (In fact, the symbology needn't be a print symbology. The technology may be used, for example, with RFID chips and RFID readers.)

While the technology is described in the context of debugging watermark functionality included in firmware built by a different party, the technology is more broadly applicable. For example, a scanner vendor may include such functionality it is own software (e.g., software 22) to facilitate outputting of certain stored data, without involving a diagnostic interface or requiring administrative privileges. Such capability can aid, e.g., field service, maintenance and upgrading of scanners. Further, use of the technology is not limited to retail scanners. Any camera equipped device (e.g., a mobile phone) that recognizes information from imagery, and sends corresponding data to an output, can similarly be employed to send data from a memory instead—disguised as recognition information.

Likewise, it should be recognized that "man in the middle" hazards arise in other contexts in which data is to be passed through software whose actions on the data are uncertain. The detailed principles can naturally be employed in such other situations.

While the foregoing description noted that values M and N may be input to the scanner by a barcode, and serve to configure how the debug data reporting mechanism outputs faux GTINs, other data can be entered in similar fashion— including configuration data of the type depicted in FIGS. 4A and 4B. In one particular embodiment, an electronic display—such as an e-ink display—is positioned, face-down, on the scanner platen, and presents a sequence of barcode indicia for decoding. A first, special, barcode initiates a re-configuration session, and following barcodes can successively convey chunks of configuration data. A final special barcode can terminate the re-configuration session. By such arrangement, the positions, sizes, and other parameters of blocks for watermark decoding can be re-configured, without generating new firmware.

The algorithms detailed above can be implemented in a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed processes on a microprocessor—such as the process of converting chunks of binary data from the diagnostic memory to corresponding 12 digit GTINs, etc.—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

While microprocessors can be reprogrammed, by suitable software, to perform a variety of different algorithms, ASICs cannot. While a particular Intel microprocessor might be programmed today to perform diagnostic data to faux GTIN conversion, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied— permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods, e.g., for the process of converting chunks of binary data from the diagnostic memory to corresponding 12 digit GTINs, etc., begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDL-Coder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations associated with conversion of binary diagnostic data to faux GTINs, etc. However, such native instruction set would lack certain of the instructions available in more general purpose microprocessors.

Reconfigurable hardware and ASIP arrangements are further detailed in published patent application 20170004597, the disclosure of which is incorporated herein by reference.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a point of sale scanner) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

Details concerning watermark decoding are known from Applicant's previous patent filings, including patent documents U.S. Pat. Nos. 8,401,224, 6,975,744, 6,973,197, 6,912,295, 6,590,996, 6,345,104, 6,307,949, 6,122,403, 20100150434, 20120078989, 20140029809, 20140052555, 20140119593, 20160275639, 20160217547, and 20170024840, and pending application Ser. No. 15/237,110, filed Aug. 15, 2016. As noted, digital watermarks are commonly imperceptible, meaning they are not noticeable to a viewer examining watermarked packaging from a typical viewing distance (e.g., 20 inches) in typical retail lighting (e.g., 50-85 foot-candles).

Suitable barcode decoding software is available from public software libraries. Examples include Zing (at the zing<dot>org and github<dot>com/zxing/zxing web sites) and Zbar (at the zbar<dot>sourceforge<dot>net web site). Applicant's patent application Ser. No. 15/094,925, filed Apr. 8, 2016 (now U.S. Pat. No. 10,198,648), and Ser. No. 15/059,690, filed Mar. 3, 2016 (now U.S. Pat. No. 9,892, 301), detail certain improvements useful in barcode decoding.

This specification has discussed various different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

The invention claimed is:

1. A method comprising the following acts, performed in the order stated:
   receiving first image data captured by a camera;
   recognizing first information from the first image data;
   sending the recognized first information to an output port;
   receiving second image data captured by the camera;
   recognizing second information from the second image data;
   sending information from a memory to said output port instead of the recognized second information.

2. The method of claim 1 in which the recognized second information comprises a steganographic digital watermark conveying a triggering payload.

3. The method of claim 1 in which the information sent from the memory comprises one or more of:
   data indicating a pixel size of images captured by the camera; and
   data indicating whether the images captured by the camera are grayscale.

4. The method of claim 1 in which said acts of recognizing information comprise recognizing machine-readable indicia depicted in the image data, and in which the information sent from the memory comprises one or more of:
   data indicating a type of machine-readable indicia expected; and
   data indicating whether the method should advance to analyze a next frame of image data when one indicia is read from a current frame of image data.

5. The method of claim 1 in which said acts of recognizing information comprise recognizing machine-readable indicia depicted in the image data, and in which the information sent from the memory to said output port comprises one or more of:
   data indicating a particular location within captured frames that should be analyzed for machine-readable indicia;
   data indicating whether perspective correction should be applied to the captured image frames; and
   parameters for any perspective correction that should be applied to the captured image frames.

6. The method of claim 1 in which said acts of recognizing information comprise recognizing machine-readable indicia depicted in the image data, and in which the information sent from the memory to said output port comprises data indicating pose information for a last-decoded indicia.

7. The method of claim 1 in which said acts of recognizing information comprise recognizing machine-readable indicia depicted in the image data, and in which the information sent from the memory to said output port comprises data indicating a version identifier for indicia decoding software.

8. The method of claim 1 in which said acts of recognizing information comprise recognizing machine-readable indicia depicted in the image data, and in which the information sent from the memory to said output port comprises data indicating a signal-to-noise ratio of a last-decoded indicia.

9. An apparatus comprising:
   a memory;
   a camera;
   an output port;
   one or more processors configured to process image frames captured by the camera to generate identification data for physical items depicted in said captured frames, and send the identification data through said output port; and
   means for sending configuration or diagnostic data from the memory to said output port through which the identification data is also sent.

10. The apparatus of claim 9 in which said means is responsive to depiction of a trigger object in a captured image frame.

11. The apparatus of claim 10 in which the trigger object is an object bearing a machine-readable indicia that conveys a triggering payload.

12. The apparatus of claim 9 in which said means includes means for transforming the configuration or diagnostic data to mimic said identification data.

13. The apparatus of claim 9 in which said means includes means for transforming the configuration or diagnostic data to prevent duplicate detection logic in the apparatus from suppressing sending of said configuration or diagnostic data.

14. A method employing a camera-equipped apparatus that is configured for (a) capturing image frames depicting physical items, (b) processing the captured image frames to generate identification data for the physical items; and (c) sending the identification data through an output port for delivery to an item tallying component, the method comprising the acts:
   sensing a triggering item presented to the camera of the apparatus; and
   in response, sending configuration or diagnostic data from a memory of the apparatus to said output port through which the identification data is also sent.

15. The method of claim 14 in which the apparatus is configured to analyze captured image frames for machine-readable indicia conveying plural bit payloads, and the configuration or diagnostic data comprises one or more of:
   data indicating a pixel size of captured image frames; and
   data indicating whether captured image frames are grayscale.

16. The method of claim 14 in which the apparatus is configured to analyze captured image frames for machine-readable indicia conveying plural bit payloads, and the configuration or diagnostic data comprises one or more of:
   data indicating a type of machine-readable indicia expected; and data indicating whether the method should advance to analyze a next frame when one indicia is read from a current frame.

17. The method of claim 14 in which the apparatus is configured to analyze captured image frames for machine-readable indicia conveying plural bit payloads, and the configuration or diagnostic data comprises one or more of:

data indicating a particular location within captured frames that should be analyzed for machine-readable indicia;

data indicating whether perspective correction should be applied to the captured image frames; and parameters for any perspective correction that should be applied to the captured image frames.

18. The method of claim 14 in which the apparatus is configured to analyze captured image frames for machine-readable indicia conveying plural bit payloads, and the configuration or diagnostic data comprises data indicating pose information for a last-decoded indicia.

19. The method of claim 14 in which the apparatus is configured to analyze captured image frames for machine-readable indicia conveying plural bit payloads, and the configuration or diagnostic data comprises data indicating a version identifier for indicia decoding software.

20. The method of claim 14 in which the apparatus is configured to analyze captured image frames for machine-readable indicia conveying plural bit payloads, and the configuration or diagnostic data comprises data indicating a signal-to-noise ratio of a last-decoded indicia.

\* \* \* \* \*